United States Patent [19]

Wallace

[11] 4,362,572

[45] Dec. 7, 1982

[54] METHOD AND APPARATUS FOR CLEANING INK JET PRINTER HEADS

[75] Inventor: Harry L. Wallace, Livonia, Mich.

[73] Assignee: Burroughs Corporation, Detroit, Mich.

[21] Appl. No.: 277,276

[22] Filed: Jun. 25, 1981

[51] Int. Cl.[3] ........................ B08B 7/04; G01D 15/18

[52] U.S. Cl. ........................................ 134/18; 15/319; 134/21; 239/106; 346/140 R

[58] Field of Search ............... 134/18, 21, 40; 15/319, 15/339; 239/106, 112; 400/126; 346/25, 75, 140 PD

[56] References Cited

U.S. PATENT DOCUMENTS 3,945,021 3/1976 Kraus et al. .......................... 346/75
4,123,761 10/1978 Kimura et al. ............... 346/140 PD
4,283,731 8/1981 Bok et al. .......................... 346/25 X
4,293,867 10/1981 Isayama ......................... 346/14 PD
4,296,418 10/1981 Yamazaki et al. ....... 346/140 PD X

*Primary Examiner*—Marc L. Caroff
*Attorney, Agent, or Firm*—Delbert P. Warner; Kevin R. Peterson

[57] ABSTRACT

A method and apparatus for removing dust and trapped air from the orifices of an ink jet printer employed in a document handling machine. A vacuum is applied periodically to clean the ink jet head of dust, entrapped air and excess ink. The period is established in accordance with predetermined requirements and is measured by a count of documents or other measurements of time relating to the passage of documents.

4 Claims, 6 Drawing Figures

METHOD AND APPARATUS FOR CLEANING INK JET PRINTER HEADS

BACKGROUND OF THE INVENTION

1. Field of the Invention

The invention relates to ink jet printers employed with document handling machines and the like and particularly to means for improving the performance of ink jet printers in the environments associated with such machines. The invention relates further to a system for removing dust, bubbles of air, and other contaminants from the head of an ink jet printer and particularly from the orifices and the vicinity of the orifices of such ink jet printers.

2. Description of the Prior Art

Ink jet printers depend for reliability on the maintenance of clean orifices so that droplets of ink can be readily produced as required. In the usual drop on demand configurations for ink jet printers, several orifices are arranged in a pattern and droplets of ink are shot out of selected orifices to produce patterns of dots representing desired characters. In the usual environments in which such jets are employed, wipers are provided which are moved across the openings of the orifices to wipe them clean between times when ink droplets are being produced. The wipers generally operate efficiently in clean environments, chiefly to remove small particles, such as dust, which might otherwise accumulate in and around the orifices.

In the environment to which the present invention has application, large numbers of documents, on the scale of 40,000–100,000 or more per day, are moved along a pathway. In order to align these documents properly so that they may be "read" by character reading machines, they must be moved along in contact with metal guides on the sides and in the bottom of the pathway. Motion along these guides produces wear on the documents which is associated with the formation of dust. After several thousand documents have passed along the path there is a build-up of dust, some of which is picked up by the following documents and by air around those documents and carried to the vicinity of the orifices in the ink jet printer head. Due to a mechanism which is not fully understood, as the documents pass the orifices some of the dust entrained with the documents will strike the orifices where some of it will adhere to surfaces and to ink in and around the orifices. For a time, the wiper will successfully clean off the accumulation of dust and dust mixed with ink. Eventually, however, the wipers will become contaminated with the mixture of ink and dust and some of the mixture will be moved in front of one or more of the orifices obstructing their entrances. The desired ink drops will not then flow properly from the obstructed orifices and characters will be malformed.

Among the prior art devices developed to combat this problem is art disclosed in copending patent application Ser. No. 277,277 in the names of John D. Thomas and Harry L. Wallace, filed of even data herewith, entitled "Method and Apparatus for Eliminating Dust from Ink Jet Printers" and assigned to the same assignee as the present invention. This copending application is hereby incorporated by reference.

The above referenced copending application teaches the use of a preventive method and apparatus which excludes dust from the ink jet head by stirring up the air carrying the dust near the head in such a way that most of the dust is carried past the head and therefore does not contaminate the head. This procedure helps keep the ink jet head and associated orifices clear, however, it has not proven to be completely effective when the document handling machine is run for a substantial period of time. Eventually, if the document handling machine is run for a long enough time without being stopped for cleaning, dust and ink will build up on the wiper and the ink jet head. This mixture of dust and ink forms a kind of paste, or a slurry, which adheres to the wiper and smears across the orifices in such a way that the orifices cannot be wiped clean.

The present invention has been developed to remove dust particles and accumulated mixtures of dust and ink away from the head and the orifices of the jets so that check endorsers and the like will continue to function properly even after thousands of documents have been processed and the associated accumulation of dust and ink dust mixture would otherwise tend to clog orifices of the ink jet.

Another problem associated with ink jet printers is that of air bubbles forming in the jets. In any hydraulic system, air can be a problem. In ink jet printers it is especially irksome, since a tiny bubble can obstruct the passage of ink through a jet orifice or cause drops of ink from the orifice to be deflected from their proper courses. The present invention overcomes this problem of air bubbles in ink jets by purging them from the orifices through application of a vacuum.

BRIEF SUMMARY OF THE INVENTION

The invention relates to a method and apparatus for use in cleaning an ink jet printer having a jet head supporting an array of orifices through which ink is fed to form images. Cleaning involves recovering dust, ink-dust slurries, trapped air and other contaminants from the jet head and the orifices.

The invention was developed particularly for use in document processing machines where heavy travel of documents generates unusual amounts of dust which clogs the orifices of the ink jets and prevents them from forming characters in the proper way. The cleaning method used not only removes dust and ink-dust mixtures but purges the system of bubbles of air which become entrapped in the orifices.

In practice, a vacuum is applied to the ink jet head and the orifices from a means for providing a vacuum. As the vacuum is applied it removes the contaminants, leaving the ink jet head and the orifices clean so that subsequent drops of ink can be ejected and travel along proper orbits to form characters on suitable surfaces.

The vacuum is needed only on a part-time basis to remove contaminants after they accumulate. A substantial number of documents may be processed between cleaning cycles, and controls are employed which periodically direct the vacuum to clean off the contaminants during limited periods. Since the amount of contamination of the ink jets is directly related to the number of documents carrying dust which pass by, a counter associated with a microprocessor is employed to count signals from a sensor which detects the documents. After a prescribed number have passed, the microprocessor may then provide a signal to the controls to direct the vacuum to clean the orifices for a brief time after which the vacuum will be disengaged.

DESCRIPTION OF A PREFERRED EMBODIMENT

Figure 1:
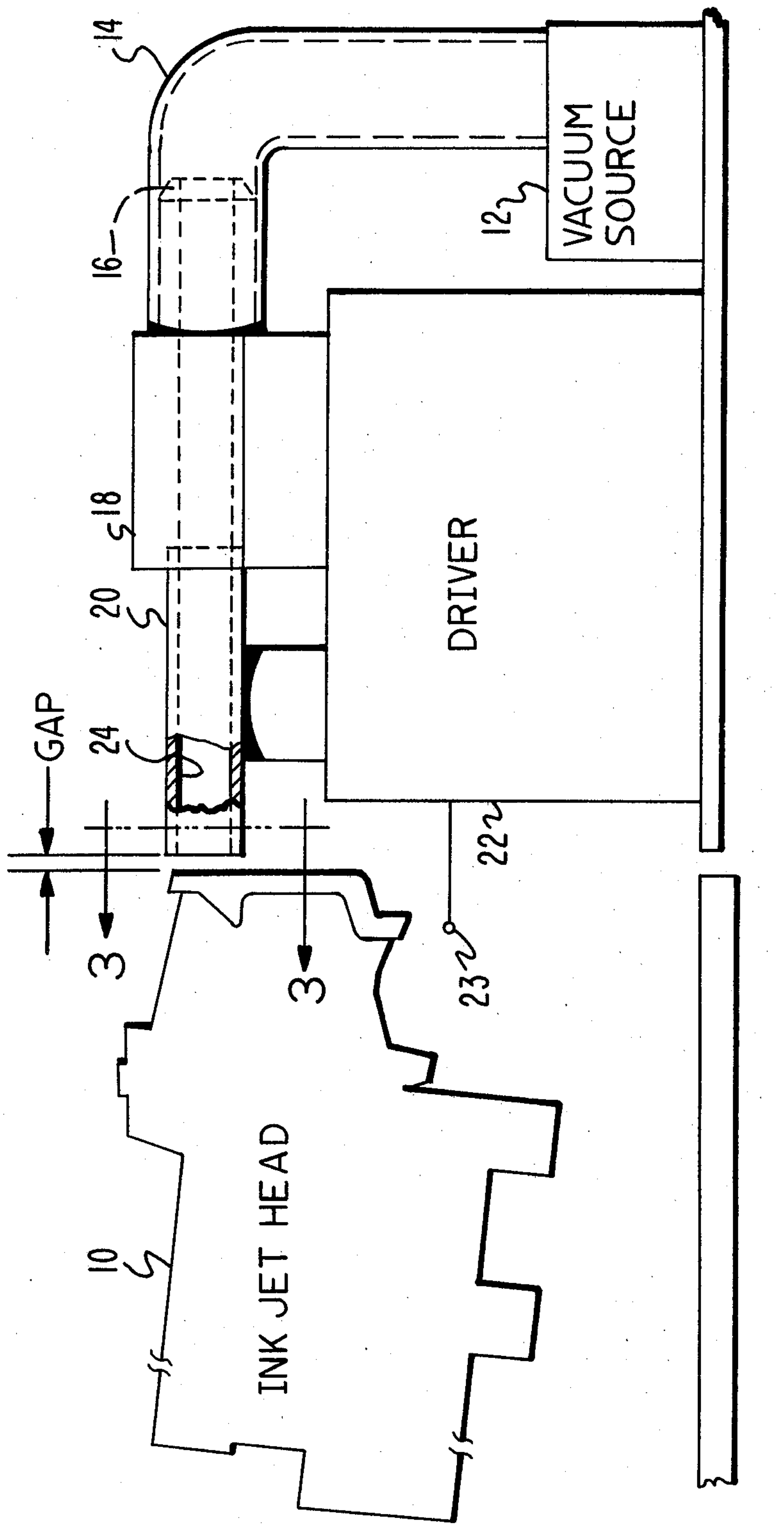
FIG. 1 is a schematic view in elevation showing an embodiment of the invention.

Turn to FIG. 1, for a view in elevation of a preferred embodiment of the invention. In this view, an ink jet head of the drop-on-demand type is indicated at 10. A low pressure, or vacuum source is indicated at 12 which is coupled via a tube, or hose, 14 and a connector 16 to a block 18. A rotary valve at 20 is driven by a suitable driver, such as a motor or a solenoid in a block 22, between a position in which the vacuum line is open to the face of the ink jet head and a position in which the line is closed. It will be recognized that the driver 22 can be controlled over a line such as 23 by a microprocessor, such as an Intel 8035, which is used to control the document processor to which this invention relates. In this way, the vacuum can be applied on a selective basis to clean the ink jet head at intervals selected to keep the head functional.

Reference may be made to copending U.S. patent application Ser. No. 215,266 filed on Dec. 11, 1980, in the name of Harold A. Fasig, assigned to the same assignee as the present invention, entitled "Track Controller for a Document Processor" for a description of a system to which the present invention relates. Said copending application is hereby incorporated by reference.

Figure 2:
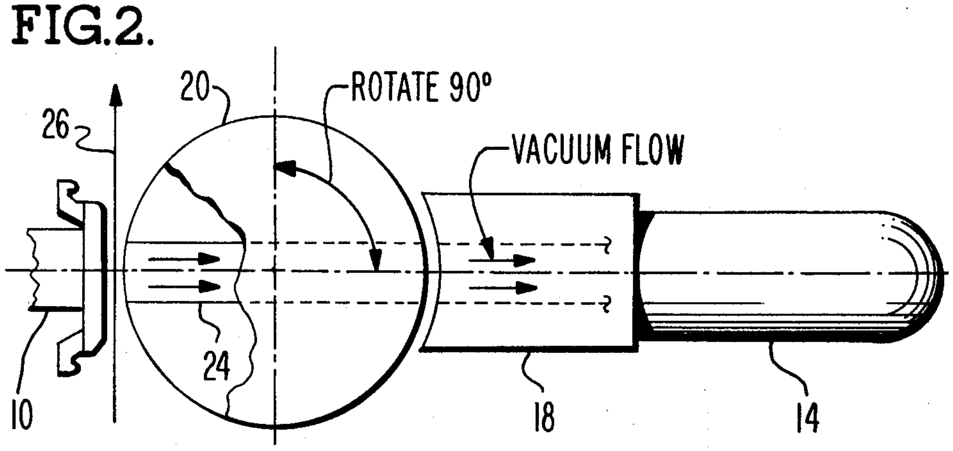
FIG. 2 is a top view of a portion of the embodiment of FIG. 1.

A top view is shown in FIG. 2 of a portion of the embodiment of FIG. 1. As shown in FIG. 2, the valve 20 is open and the system according to the present invention is in the active mode, which means the vacuum is applied through 14 and 18 and through a bore, shown in partial section at 24, to the face of the ink jet head. When the valve 20 is moved by the driver 22, the bore 24 is rotated away from the position shown in FIG. 2 and the connection to the vacuum reservoir 12 is gradually cut off until no further vacuum pressure is applied.

In the top view of FIG. 2, document flow is as shown by the arrow 26, permitting the orifices in the jet head to apply drops of ink on the side of the document facing the jet head.

Figure 3:
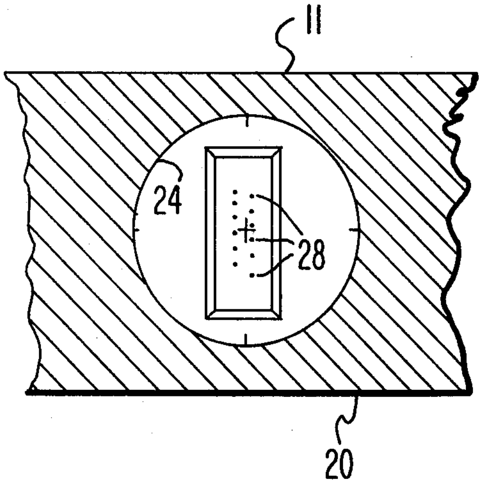
FIG. 3 is a view of the ink jet orifices and a portion of the vacuum control apparatus in section along the lines 3—3 in FIG. 1.

The face 11 of an exemplary ink jet head, having twelve individual jet orifices 28, is shown in the partial section of FIG. 3, where the section is taken along 3—3 in FIG. 1.

The use of an ink jet head such as that shown in FIG. 3 is described in a copending U.S. Patent application Ser. No. 145,779 in the names of Harry L. Wallace and John M. Chambors entitled "Matrix Printer Employing a Special Character Font" and assigned to the same assignee as the present application. A related U.S. Patent application Ser. No. 145,780 was filed May 2, 1980 in the names of John M. Chambors and Harry L. Wallace entitled "System for Matrix Printing" and assigned to the same assignee as the present application. Both of these copending applications are incorporated by reference herein.

In normal operation, the vacuum will be applied to the jet orifices automatically according to a schedule established on the basis of need to clean and purge the orifices. Ordinarily, it is expected that several hundred documents can be endorsed between requirements to clean the orifices. As indicated previously, control of the application of the vacuum may be provided by a system microprocessor which controls the driver at 22 and the valve 24.

The GAP indicated in FIG. 1 will ordinarily be of the order of about 0.040 inch in order to provide sufficient space for the passage of documents and, at the same time, enable effective use of a vacuum in cleaning and purging the ink jet head 10 and the orifices 28.

Figure 4:
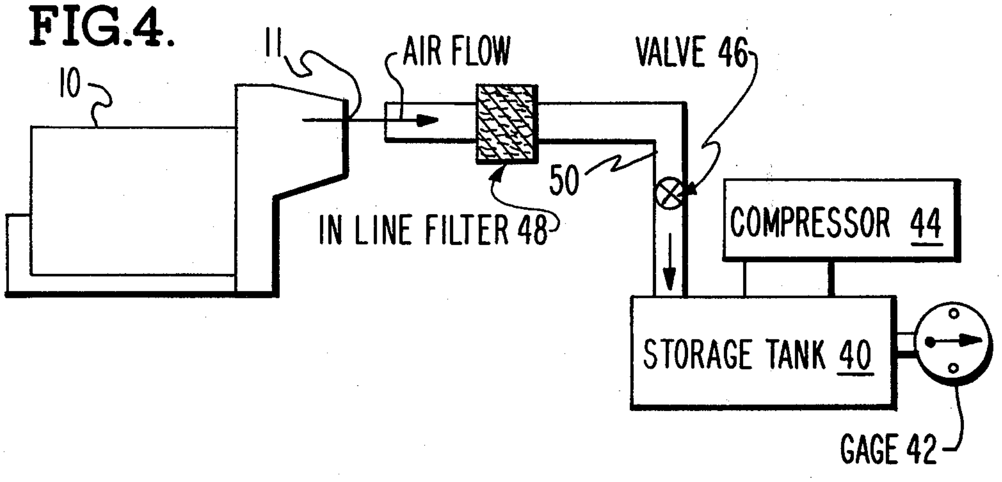
FIG. 4 is a schematic view showing an alternative system of use in the practice of the invention.

FIG. 4 illustrates an embodiment of the invention in which a storage tank 40 is used as a vacuum source. A gage at 42 may be used to alert an operator of failure of the vacuum system. A compressor at 44 may be used to maintain the vacuum in 40 at a desired level. In this embodiment, a valve at 46 may be opened and closed under control of the system microprocessor to apply the vacuum to the ink jet head. An in-line filter is added at 48 in the vacuum line 50 to prevent ink and dust from accumulating in the valve 46 and the tank 40.

Figure 5:
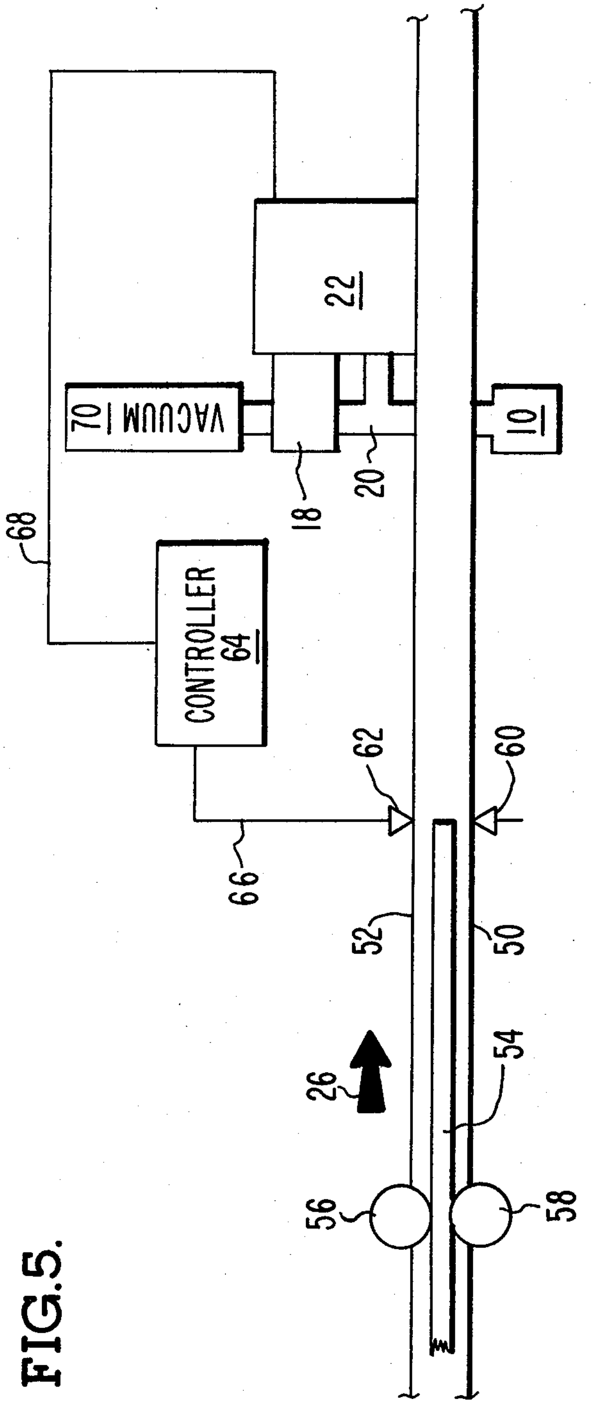
FIG. 5 is a plan view of a schematic showing details of a document transporting track as it relates to the present invention.

Futher details relating to application of the invention are shown in FIG. 5. The walls of a document transporting track are indicated at 50 and 52 with a document at 54 moving in the direction of the arrow 26. It will be recognized that a plurality of rollers spaced along the track, such as those indicated at 56 and 58, may be driven by means not shown to move a series of documents such as document 54 along the track.

A sensing system, represented by an LED at 60 and a phototransistor at 62 is used to detect the passage of documents such as 54. A controller at 64, which includes a counter and may form a part of a microprocessor such as an 8035, responds to pulses over line 66 from the phototransistor 62 to provide a count of the number of documents passing through the track. When a preselected count level is reached, the controller provides a signal over line 68 to advise the driver 22 to apply a vacuum from a vacuum source 70 to the face 11 of the ink jet head 10.

Figure 6:
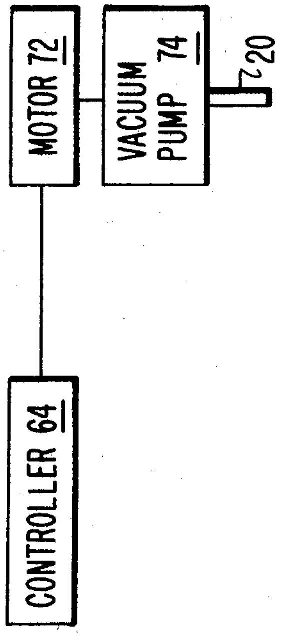
FIG. 6 is a block diagram illustrating the use of a motor and a vacuum pump to directly provide a vacuum for use in the practice of the invention.

FIG. 6 illustrates a single and very direct method for providing the desired vacuum. In this example, the controller simply turns a motor 72 "on" to drive a vacuum pump at 74 at desired times and for the prescribed period. It will be seen that this embodiment may be employed using a single vacuum cleaner. Since there is a finite delay in building up the vacuum after the motor is turned "on" it will be recognized that this approach will be attended by some loss in precision in cleaning the head. In most cases this will not matter, since cleaning is done only after the passage of hundreds, and sometimes thousands of documents, and cleaning within the space of a few documents will be satisfactory.

It will be recognized that any desired source of vacuum may be employed without deporting from the spirit of the present invention. In addition, it will be seen that the type of valve employed to connect and disconnect the vacuum source is not important in the practice of the invention. It will be recognized that, in a particular case, a simple vacuum source such as that represented by a vacuum sweeper could be used and turned "on" when a vacuum is needed, since it is not essential that the vacuum be applied at a precise moment.

What is claimed is:

1. In a document processing machine including a track for transporting documents and employing an ink jet printer having a jet head, the jet head including an array of orifices through which ink is fed to form images, means for removing dust, ink-dust slurries, trapped air and other contaminants from the jet head and the orifices, comprising:

means for providing a vacuum;

coupling means having a first end connected to said means for providing a vacuum and a second end positioned relative to the jet head and the orifices to apply the vacuum thereto;

means for determining when a vacuum should be applied and providing signals designating when;

said means for determining when a vacuum should be applied including sensing means employing electromagnetic devices to detect the passage of documents through the document processing machine and provide said signals, and controller means responsive to said signals to regulate the application of the vacuum to the ink jet head and the orifices at prescribed intervals and for limited periods;

the controller means including counter means responsive to signals from said sensing means to count the number of documents passing the sensing means;

said controller means responding to a predetermined count to provide signals to control the application of the vacuum;

whereby the vacuum removes obstructing contaminants from the ink jet head and the jet orifices.

2. The invention as claimed in claim 1, in which:

the means for providing a vacuum includes a motor coupled by mechanical means to a vacuum pump; and the controller operates the motor, turning it "on" and "off" to control the vacuum.

3. The invention as claimed in claim 1, in which:

the means for providing a vacuum includes means for establishing a reservoir of vacuum pressure;

the coupling means includes a valve which is actuated by a driver to connect or disconnect the vacuum via the coupling means to the ink jet head; and the controller means provides control signals to the driver to control the valve and thus select when the vacuum is applied.

4. A method for cleaning an ink jet head and orifices in the head where the head and the orifices are contaminated by dust and ink from documents moved along a track of a document processing machine and the orifices contain air bubbles from ink provided from a hydraulic system, comprising:

providing a source of vacuum pressure;

coupling a first end of a conduit to said source of vacuum pressure and a second end of the conduit to the vicinity of the ink jet head and orifices to be cleaned;

determining when a vacuum should be applied by counting the documents passing along the track until a selected count is reached; and when the determination is made, applying said vacuum pressure through said conduit to remove dust, ink and air bubbles from the ink jet head and orifices, whereby the ink jet head is cleaned as required.

* * * * *